United States Patent [19]

Krug et al.

[11] Patent Number: 5,218,024

[45] Date of Patent: Jun. 8, 1993

[54] WATER- AND SOLVENT-FREE RELEASE AGENT FOR POLYURETHANE FOAMING

[76] Inventors: William Krug, Laubenweg 7, D-6900 Heidelberg; Wolfgang Fischer, Hellklinger Str. 31, D-6942 Morlenbach, both of Fed. Rep. of Germany

[21] Appl. No.: 486,590

[22] Filed: Feb. 28, 1990

[30] Foreign Application Priority Data

Mar. 7, 1989 [DE] Fed. Rep. of Germany ....... 3907235

[51] Int. Cl.$^5$ .............................................. C08L 19/00
[52] U.S. Cl. .................................... 524/232; 524/267; 524/322; 264/51; 106/38.22; 106/38.24
[58] Field of Search ...................... 524/232, 267, 322; 264/51; 106/38.22, 38.24

[56] References Cited

U.S. PATENT DOCUMENTS

| | | | |
|---|---|---|---|
| 3,981,447 | 9/1976 | Bachofen et al. | 417/296 |
| 4,609,511 | 9/1986 | Fischer et al. | 521/51 |
| 4,783,296 | 11/1988 | Fischer et al. | 252/34 |
| 4,892,585 | 1/1990 | Fischer et al. | 427/133 |
| 4,925,882 | 5/1990 | Makus | 521/132 |
| 4,969,952 | 11/1990 | Hattich et al. | 106/271 |

FOREIGN PATENT DOCUMENTS 1340494 12/1973 United Kingdom.

*Primary Examiner*—Maurice J. Welsh
*Assistant Examiner*—Rachel Johnson

[57] ABSTRACT

A water- and solvent-free release agent for use in the production of articles of polyurethane foam contains one or more polyenes as the main constituent and also in addition if required a consistency adjuster, an antioxidant, accelerators and/or stabilizers. To apply water- and solvent-free release agents to the surfaces of polyurethane-foam moulding dies the misting or atomization of the release agent is effected with a device with an electrostatic charge, by which the release agent particles are given an electrostatic charge when passing through the exit nozzle.

20 Claims, No Drawings

WATER- AND SOLVENT-FREE RELEASE AGENT FOR POLYURETHANE FOAMING

The invention relates to a water- and solvent-free release agent for use in the production of articles of polyurethane foam and a process for the production of articles of polyurethane foam in which this release agent is used.

The production of articles of polyurethane foam is carried out in moulds and can take place according to many varied processes known from the prior art (cf. e.g. the detailed explanations in the European Patent Applications 164 501, 223 233 and 272 629). Before the polyol/isocyanate components are introduced a release agent is applied to the surface of the forming die, this release agent is intended to prevent the reacted polyurethane foam article from sticking fast in the forming die. These release agents consist of release-effective substances and additives which are in a dissolved, suspended, dispersed or emulsified form in solvents or water (cf. the explanations in the European Patent applications already cited above). The solvent or water acts as a diluant and carrier so as to enable the release agent to be applied with the known spray techniques and a thin homogeneous film of the release agent to be formed on the die surface. These spray techniques are varied processes operating either with or without air, in which the sprayed substance is sprayed in a mist at room temperature or in a heated state. The use of heated atomiser air is also known.

It is known that both solvent-based and water-based release agents have considerable shortcomings. The solvent or water must for example be evaporated from the release-agent film which is forming, after the release agent has been applied, so as not to disturb the subsequent isocyanate/polyol reaction. Solvents admittedly evaporate very rapidly but they create a fire-hazard and are damaging to health and the environment. In addition their use in a percentage of up to 97% must be regarded as highly uneconomical because they do not give any valuable contribution to the operation of the release agent. Water does not have these disadvantages but it is slow to evaporate and consequently due to operational parameters considerably limits the possible applications of a release agent (cf. again the explanations in the European Patent Applications cited above). A further great disadvantage in the use of water-based release agents can be seen in the formation of polyureas, which are formed by the side reactions of the isocyanate with the residual water fraction of the release-agent film. These polymers cause reactive coatings which adhere to the die surfaces, are very difficult to remove and increasingly have a negative effect on the release action, resulting in cost-intensive cleaning processes.

The aim of the present invention is accordingly to propose a new release agent which contains negligible amounts of both water and solvent and thus avoids the disadvantages connected with the known release agents containing water and/or solvent.

To achieve this aim a water- and solvent-free release agent is proposed for use in the production of articles of polyurethane foam, characterised in that it contains one or more polyenes as the main constituent.

It has surprisingly been found that polyenes have a high degree of compatibility with foam systems. Even admixtures of, for example, 4 to 5% of a polyene into the A-component of a delicate high-flexible foam system did not cause any disturbances in the foam during the subsequent reaction process.

Due to this behavior polyenes themselves have releasing properties to a certain extent, and therefore they can act as carrier materials for other known release agent additives and at the same time can also act themselves as substances promoting the release effect.

Because they are extensively ecologically and toxicologically harmless polyenes not only represent a valuable alternative to the solvents previously used but due to their release effect also contribute to a drastic reduction in the consumption of release agent and to the reduction of aerosol formation at the work place.

A further advantage of the release agent according to the invention can be seen in its high specific electrical resistance which allows the particularly favourable application of such release agents on to polyurethane foam die surfaces both using conventional spray technology and by electrostatic spray processes.

When the usual spray techniques are used in combination with an electrostatic treatment the release agent particles are given an electrostatic charge on passing through the exit nozzle as a result of which they are on the one hand broken up again which leads to better atomisation (finer distribution), and on the other due to the opposed charges (particle - die) very homogeneous coatings are obtained on the forming die surface. This effect is known in principle from the paint industry where some highly stringy viscous products also have to be processed. Thus electrostatic air atomisation spray guns known from the paint industry can be used to particular advantage according to the invention and give homogeneous, thin films of release agent. With the above advantages deriving from the electrostatic spray technique a further reduction of the release agent consumption results. Subject of the invention is therefore also a process for applying water- and solvent-free release agent to the surfaces of polyurethane-foam moulding dies.

The polyenes suitable for the release agent according to the invention have a sprayable consistency which if necessary is obtained by heating. Liquid polybutadienes are very suitable, and of these poly-1.4-cis-butadiene is preferred. It is of advantage here if the vinyl group fraction of the poly-1.4-cis-butadiene is about 1%. These have a viscosity of about 3000 mPa.s at 20° C.

It is either necessary or preferable according to the polyene used for the release agent according to the invention to contain a consistency adjuster. The usual fats, waxes and oils are in the main suitable for this and at the same time improve the release effect. Because of the double-bonds present in the polyenes used according to the invention it is in addition advantageous for the release agent to contain an antioxidant. Alkylated phenols, e.g. nonyl-phenols, have in particular proved useful for this purpose.

In addition to these substances the release agent according to the invention can also contain other conventional substances with a release effect, the amount used depending on compatibility with the other constituents of the release agent and the processing requirements. Examples of conventional substances with a release effect for which polyenes act as carriers are silicon compounds, fatty acid amides, fatty acid esters etc. (cf. e.g. the European Patent Applications cited above).

The release agent according to the invention can of course also contain the usual additives, such as accelerators, foam stabilisers etc.

It is an essential feature of the release agent according to the invention that it is completely or at least essentially free from water and organic solvents. It can be produced by all the constituents being added together and thoroughly intermixed to form a homogeneous mixture with heating if necessary.

It is surprising that the release agent according to the invention forms a sufficiently even and completely homogenous release agent film on the die surface even without the interaction of the known diluants and carriers such as water and solvent. Due to the favourable properties, described above, of the polyenes used it is sufficient in general if 10 to 15 g/m$^2$ and particularly about 12 g/m$^2$ of the release agent according to the invention is applied.

EXAMPLE 1

Test pieces were foamed in a 2 litre aluminium test die using a commercially available high-flexible foam system. The application of the release agent was carried out using a high-pressure airless device, in which the nozzle diameter was 0.08 mm. The release agent used was heated to 80° C. and had the following composition:

| | |
|---|---|
| amine accelerator | 3% by weight |
| silicon stabiliser | 3% by weight |
| nonyl-phenol (antioxidant) | 4% by weight |
| low-molecular polyetylene wax (consistency adjuster) | 5% by weight |
| poly-1.4-cis-butadiene | 85% by weight |

Foam bodies were obtained which were easily removable from the mould and free from surface disturbances.

EXAMPLE 2

The release agent described in Example 1 was heated to about 80° C. and then applied to the surface of the forming die using a spray gun with an air-atomising circular jet nozzle with electrostatic charge. The result was that particularly thin, homogeneous films of release agent were produced using this arrangement. The foam bodies produces were satisfactory in every way.

What is claimed is:

1. A water and solvent-free release agent for use in the production of polyurethane foam, comprising:
   a) a major amount of a carrier comprising one or more polymeric polyenes; and
   b) a minor amount of a substance exhibiting a release effect.

2. A release agent according to claim 1, wherein said polyene is present in an amount of from about 50 to 95% by weight.

3. A release agent according to claim 2, wherein said polyene is present in an amount of from about 80 to 85% by weight.

4. A release agent according to claim 2, wherein the substance exhibiting a release effect is selected from the group consisting of silicon compounds, fatty acid amides and fatty acid esters.

5. A release agent according to claim 4, wherein said polyene is a polybutadiene.

6. A release agent according to claim 5, characterized in that the polybutadiene is poly-1,4-cis-butadiene.

7. A release agent according to claim 6, wherein said poly-1,4-cis-butadiene comprises a poly-1,4-cis-butadiene with a vinyl group fraction of about 1% by weight.

8. A release agent according to claims 4 or 5, further comprising an effective amount of a consistency adjuster.

9. A release agent according to claims 4 or 5, further comprising an effective amount of an antioxidant.

10. A release agent according to claims 4 or 5, further comprising an effective amount of an accelerator and/or a stabilizer.

11. A method for the production of polyurethane foam articles comprising the steps of:
   a) applying a release effective amount of a release agent comprising, in combination, (i) a major amount of a carrier comprising one or more polymeric polyenes, and (ii) a minor amount of a substance exhibiting a release effect, to the molding surfaces of a polyurethane foam die;
   b) incorporating a foamable polyurethane precursor composition into said die;
   c) reacting said foamable polyurethane precursor composition to produce a foamed polyurethane article; and
   d) removing said foamed polyurethane article from said die.

12. The method of claim 11, wherein said release agent is applied to the molding surfaces of said die in an amount of from about 10 to 15 grams of release agent per square meter of molding surface.

13. The method of claim 12, wherein said release agent is applied to the molding surfaces of said die by atomizing and spraying said release agent on to the molding surfaces of said die.

14. The method of claim 13, wherein said release agent is applied to the molding surfaces of said die by an electrostatic, air-atomizing spray gun whereby the release agent particles are given an electrostatic charge.

15. The method of claim 14, wherein said polyene is present in an amount of from about 50 to 95% by weight.

16. The method of claim 15, wherein the substance exhibiting a release effect is selected from the group consisting of silicon compounds, fatty acid amides and fatty acid esters.

17. The method of claim 16, wherein said polyene is a polybutadiene.

18. The method of claim 17, wherein said release agent further comprises an effective amount of a consistency adjuster.

19. The method of claim 17, wherein said release agent further comprises an effective amount of an antioxidant.

20. The method of claim 17, wherein said release agent further comprises an effective amount of an accelerator and/or a stabilizer.

* * * * *

UNITED STATES PATENT AND TRADEMARK OFFICE
CERTIFICATE OF CORRECTION

PATENT NO. : 5,218,024

DATED : 8 June 1993

INVENTOR(S) : William Krug and Wolfgang Fischer

It is certified that error appears in the above-identified patent and that said Letters Patent is hereby corrected as shown below:

On the title page, item (75) Assignee: Insert the following;

"Assignee: Air Products and Chemicals PURA GmbH & Co.
Norderstedt, Germany

Signed and Sealed this

Fifteenth Day of March, 1994

*Attest:*

BRUCE LEHMAN

*Attesting Officer*     *Commissioner of Patents and Trademarks*